(12) United States Patent
Ukai

(10) Patent No.: US 10,833,339 B2
(45) Date of Patent: Nov. 10, 2020

(54) FUEL CELL SYSTEM AND METHOD OF RUNNING FUEL CELL SYSTEM

(71) Applicant: Panasonic Intellectual Property Management Co., Ltd., Osaka (JP)

(72) Inventor: Kunihiro Ukai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 152 days.

(21) Appl. No.: 15/713,124

(22) Filed: Sep. 22, 2017

(65) Prior Publication Data

US 2018/0108922 A1   Apr. 19, 2018

(30) Foreign Application Priority Data

Oct. 14, 2016   (JP) .................................. 2016-202582

(51) Int. Cl.
*H01M 8/04007*   (2016.01)
*H01M 8/0612*   (2016.01)
(Continued)

(52) U.S. Cl.
CPC ... *H01M 8/04074* (2013.01); *H01M 8/04022* (2013.01); *H01M 8/0494* (2013.01); (Continued)

(58) Field of Classification Search
CPC combination set(s) only.
See application file for complete search history.

(56) References Cited

U.S. PATENT DOCUMENTS

2013/0316256 A1* 11/2013 Kaneko ............. H01M 8/04335
429/416

FOREIGN PATENT DOCUMENTS

EP   2922131   * 9/2015   ............. H01M 8/06
EP   3026746 A1   6/2016
(Continued)

OTHER PUBLICATIONS

The Extended European Search Report dated Dec. 18, 2017 for the related European Patent Application No. 17195882.0.

*Primary Examiner* — Milton I Cano
*Assistant Examiner* — Kiran Akhtar
(74) *Attorney, Agent, or Firm* — McDermott Will & Emery LLP

(57) ABSTRACT

A fuel cell system includes: a solid oxide fuel cell generating power by using, as fuel, air supplied to a cathode and hydrogen-containing gas supplied to an anode; a combustor generating a combustion exhaust gas by combusting anode-off gas and cathode-off gas discharged from the anode and the cathode, respectively; a reformer steam-reforming a material to generate the hydrogen-containing gas supplied to the anode; a first temperature detector detecting temperatures of the combustion exhaust gas and/or the combustor; and a controller performing, if a temperature detected by the first temperature detector is lower than a preset first threshold while the combustor is forming flame, at least one of operations of: increasing a ratio of air consumed to the air supplied in the cathode; decreasing a ratio of hydrogen-containing gas consumed to the hydrogen-containing gas supplied in the anode; and decreasing an amount of water supplied to the reformer.

13 Claims, 8 Drawing Sheets

(51) Int. Cl.
  *H01M 8/0432* (2016.01)
  *H01M 8/04014* (2016.01)
  *H01M 8/04746* (2016.01)
  *H01M 8/04828* (2016.01)
  *H01M 8/04119* (2016.01)
  *H01M 8/04701* (2016.01)

(52) U.S. Cl.
  CPC ... *H01M 8/04156* (2013.01); *H01M 8/04335* (2013.01); *H01M 8/04373* (2013.01); *H01M 8/04708* (2013.01); *H01M 8/04753* (2013.01); *H01M 8/04776* (2013.01); *H01M 8/0618* (2013.01)

(56) References Cited

FOREIGN PATENT DOCUMENTS

| | | |
|---|---|---|
| JP | 2010-067547 | 3/2010 |
| JP | 2015-185213 | 10/2015 |

* cited by examiner

FUEL CELL SYSTEM AND METHOD OF RUNNING FUEL CELL SYSTEM

BACKGROUND

1. Technical Field

The present disclosure relates to a fuel cell system and a method of running a fuel cell system.

2. Description of the Related Art

Fuel cells enjoy high power generation efficiency despite their small size, and can boost their overall efficiency by using heat produced in power generation. Having these advantages, fuel cells are used as a power generator in a distributed power generation system. Particularly, solid oxide fuel cells (hereinafter also abbreviated to SOFC) using a solid oxide as an electrolyte and operating at high temperature are known to have high power generation efficiency.

In order to make the distributed power generation system function, fuel gas needs to be stably supplied to the fuel cells during power generation. Generally speaking, a fuel cell generates power by using fuel in the form of a hydrogen-containing gas obtained through a reforming reaction of material, such as natural gas consisting mainly of methane, liquefied petroleum gas (LPG), gasoline or kerosene, which is supplied from the existing infrastructure. The reforming reaction (endothermic reaction) needs to progress within a temperature range of about 550° C. to 750° C. Heat needed for the reforming reaction is generally obtained through combustion of hydrogen-containing gas which is not used in the power generation by an SOFC. Particularly, the SOFC operates at as high temperature as that in the reforming reaction. Accordingly, air not used for the power generation by the SOFC also has high temperature due to heat produced during the power generation. Thus, effective use of the thermal energy for the reaction related to the power generation realizes high-efficiency power generation.

For the purpose of effectively using the heat, some fuel cell systems employ a structure integrally housing a fuel cell stack (a set of single fuel cells), a reformer and an air heat exchanger. In a familiar example of the structure, the fuel cell stack is arranged in the center portion of the structure, and the reformer is arranged above the fuel cell stack. In another proposed example, a structure further includes: a combustor, arranged above the fuel cell stack, for combusting hydrogen-containing gas (anode-off gas) and air (cathode-off gas) which have made no contribution to the power generating reaction in the fuel cell stack; and a combustion detector arranged above the combustor (see, for example, Japanese Unexamined Patent Application Publication No. 2010-67547).

Meanwhile, since effective use of heat in a fuel cell requires a combustor to operate at an appropriate combustion state, Japanese Unexamined Patent Application Publication No. 2015-185213 discloses control of the flow rate of gas to reignite the combustor after activation of a fuel cell system. Patent Document 2 proposes, for example, a configuration in which: the fuel cell system includes a determination unit which determines whether a flameout occurs in the combustor; and the combustor is reignited with the flow rate of material or air controlled if the flameout is determined as occurring.

SUMMARY

Japanese Unexamined Patent Application Publication No. 2015-185213, however, only discloses the aforementioned control of the flow rate of gas to reignite the combustor after activation of a fuel cell system, and does not fully examine problems in the case where the combustor becomes an unstable combustion state while forming the flame.

An aspect of the present disclosure has been made with the above taken into consideration. One non-limiting and exemplary embodiment provides a fuel cell system and a method of running a fuel cell system which are capable of making the combustion state of the combust more stable than ever while the combustor is forming the flame.

In one general aspect, the techniques disclosed here feature a fuel cell system including: a solid oxide fuel cell which includes a cathode and an anode, and which generates power by using, as fuel, air supplied to the cathode, and a hydrogen-containing gas supplied to the anode; a combustor which generates a combustion exhaust gas by combusting an anode-off gas discharged from the anode of the fuel cell and a cathode-off gas discharged from the cathode of the fuel cell; a reformer which steam-reforms a material, and thereby generates the hydrogen-containing gas to be supplied to the anode of the fuel cell; a first temperature detector which detects a temperature of at least one of the combustion exhaust gas and the combustor; and a controller which performs, if the temperature detected by the first temperature detector is lower than a preset first threshold while the combustor is forming flame, at least one of an operation of increasing a ratio of the air consumed by the cathode of the fuel cell to the air supplied to the cathode of the fuel cell, an operation of decreasing a ratio of the hydrogen-containing gas consumed by the anode of the fuel cell to the hydrogen-containing gas supplied to the anode of the fuel cell, and an operation of decreasing an amount of water supplied to the reformer.

The fuel cell system and the method of running a fuel cell system of the aspect of the present disclosure have an advantageous effect of being able to make the combustion state of the combustor more stable than ever while the combustor is forming the flame.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
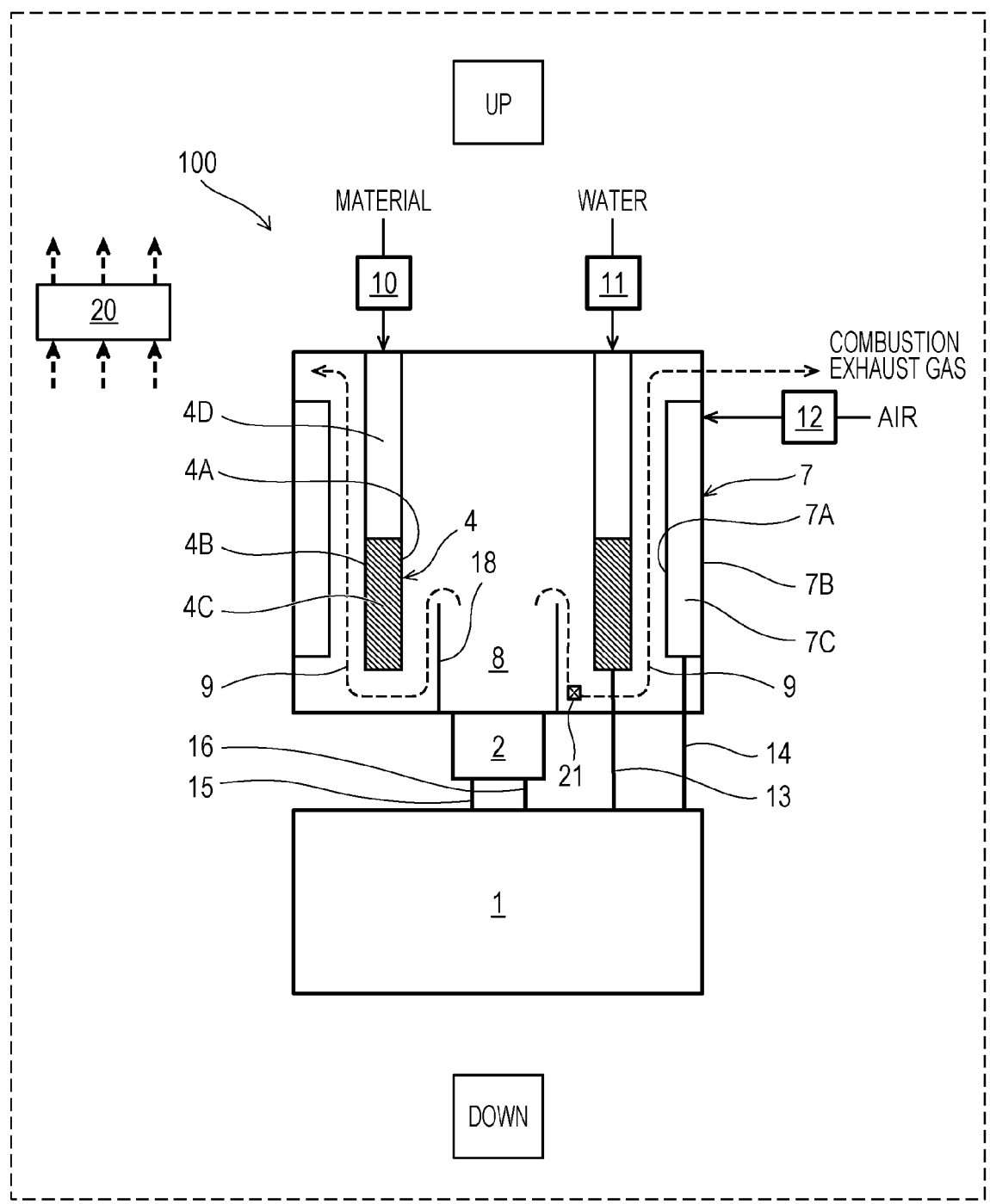
FIG. 1 is a diagram illustrating an example of a fuel cell system of a first embodiment.

While a fuel cell system is in operation, a combustion state of a combustor is likely to become unstable because an anode-off gas and a cathode-off gas, which have made no contribution to the power generation by a fuel cell, burn in the combustor. For example, the power generation by the fuel cell under high efficiency conditions requires an operation of increasing a ratio of hydrogen consumption by the anode of the fuel cell, and accordingly poses a risk that such a high-efficiency operation of the fuel cell system puts the combustor into lean burn which is close to a flameout area.

Meanwhile, if the combustor suddenly loses the flame while the fuel cell system is in operation, the temperature of the solid oxide fuel cell drops rapidly. Particularly since the electrolyte of the solid oxide fuel cell is made of ceramic, the rapid temperature change is likely to cause damage, such as heat cracking, on the electrolyte. This is a factor of degrading the fuel cell system. The degradation of the fuel cell system will lead to a decrease in the power generating performance of the fuel cell, and an impediment to high-efficiency operation of the fuel cell.

To address the above, the inventors have examined the combustion state of the combustor while the fuel cell system is in operation, and consequently found that in a combustion continuation area of the combustor from an normal combustion area up to the flameout area of the combustor, there exists an unstable area where the concentration of carbon monoxide in the combustion exhaust gas increases. Furthermore, the inventors have further found that the combustion temperature of the combustor and the concentration of carbon monoxide in the combustion exhaust gas have a correlation in the unstable area.

Here, one possible solution to the case where the combustion state of the combustor becomes unstable in the combustion continuation area up to the flameout area of the combustor is to stop the fuel cell system in accordance with a preset condition as is the case with activation of the fuel cell system. However, repeated operation of stopping the fuel cell system while the combustor is forming the flame has a risk that, as discussed above, the rapid change in the temperature of the solid oxide fuel cell will damage the electrolyte (ceramic) of the fuel cell, and disable the fuel cell system from continuing its normal operation.

A fuel cell system of a first aspect of the present disclosure is devised based on findings described above, and includes a solid oxide fuel cell. The solid oxide fuel cell includes a cathode and an anode, and generates power by using, as fuel air supplied to the cathode and a hydrogen-containing gas supplied to the anode; a combustor which generates a combustion exhaust gas by combusting an anode-off gas discharged from the anode of the fuel cell and a cathode-off gas discharged from the cathode of the fuel cell; a reformer which steam-reforms a material and thereby generates the hydrogen-containing gas to be supplied to the anode of the fuel cell; a first temperature detector which detects a temperature of at least one of the combustion exhaust gas and the combustor; and a controller which performs, if the temperature detected by the first temperature detector is lower than a preset first threshold while the combustor is forming flame, at least one of an operation of increasing a ratio of the air consumed by the cathode of the fuel cell to the air supplied to the cathode of the fuel cell, an operation of decreasing a ratio of the hydrogen-containing gas consumed by the anode of the fuel cell to the hydrogen-containing gas supplied to the anode of the fuel cell, and an operation of decreasing an amount of water supplied to the reformer.

A method of running a fuel cell system of the first aspect of the present disclosure includes, the fuel cell system includes a solid oxide fuel cell, a combustor, a reformer, and a temperature detector, in the solid oxide fuel cell which includes a cathode and an anode, generating power by using, as fuel, air supplied to the cathode of the fuel cell, and a hydrogen-containing gas supplied to the anode of the fuel cell; in the combustor, generating a combustion exhaust gas by combusting an anode-off gas discharged from the anode of the fuel cell and a cathode-off gas discharged from the cathode of the fuel cell; in the reformer, steam-reforming a material, and thereby generating the hydrogen-containing gas supplied to the anode of the fuel cell; in the temperature detector, detecting a temperature of at least one of the combustion exhaust gas and the combustor; and if the temperature detected by the temperature detector is lower than a preset threshold while the combustor is forming flame, performing at least one of an operation of increasing a ratio of the air consumed by the cathode of the fuel cell to the air supplied to the cathode of the fuel cell, an operation of decreasing a ratio of the hydrogen-containing gas consumed by the anode of the fuel cell to the hydrogen-containing gas supplied to the anode of the fuel cell, and an operation of decreasing an amount of water supplied to the reformer.

Because of the above operation, the fuel cell system and the method of running a fuel cell system of the aspect are capable of making the combustion state of the combustor more stable than ever while the combustor is forming the flame. Thereby, the combustion state of the combustor can be improved while the combustor is continuing its combustion. Thus, the damage on the electrolyte (ceramic) which is caused by the rapid change in the temperature of the fuel cell can be more inhibited than ever. Accordingly, the durability of the fuel cell system can be improved.

In other words, as during the lean burn, the combustion state of the combustor gets closer to the flameout area where the flame of the combustor is extinguished, the combustion state of the combustor becomes more unstable, and the combustion temperature of the combustor becomes lower. With this taken into consideration, the first threshold is set in advance at a combustion temperature at which the combustor can keep the steady combustion state. Accordingly, if the temperature detected by the first temperature detector is lower than the first threshold although the combustor is forming the flame, at least one of the foregoing operations is performed.

To put it specifically, since the combustor combusts the anode-off gas discharged from the anode of the fuel cell and the cathode-off gas discharged from the cathode of the fuel cell, there is likelihood that the amount of cathode-off gas (air) sent to the combustor is greater than the amount of anode-off gas sent to the combustor. In this case, the combustion state of the combustor is more likely to get into an unstable lean-burn.

To counter the likelihood, the fuel cell system and the method of running a fuel cell system of the aspect perform the operation of increasing the ratio of the air consumed by the cathode of the fuel cell to the air supplied to the cathode of the fuel cell, and thereby can decrease the amount of cathode-off gas sent to the combustor. This decrease makes the amount of cathode-off gas smaller than the amount of anode-off gas. Thus, the lean burn in which the combustion state of the combustor is unstable is eased, and the combustion temperature of the combustor rises. Accordingly, the combustion state of the combustor can be improved while the combustor is continuing the combustion.

Furthermore, the system and the method perform the operation of decreasing the ratio of the hydrogen-containing gas consumed by the anode of the fuel cell to the hydrogen-containing gas supplied to the anode of the fuel cell, and thereby can increase the amount of anode-off gas sent to the combustor. This increase makes the amount of anode-off gas larger than the amount of cathode-off gas. Thus, the lean burn in which the combustion state of the combustor is unstable is eased, and the combustion temperature of the combustor rises. Accordingly, the combustion state of the combustor can be improved while the combustor is continuing the combustion.

Moreover, the system and the method perform the operation of decreasing the amount of water supplied to the reformer, and thereby can decrease the amount of steam in the hydrogen-containing gas (hydrogen gas) sent from the reformer to the anode of the fuel cell. This decrease makes it possible to decrease the quantity of heat which the reformer needs from the combustion exhaust gas to evaporate the water, and thereby increases the amount of heat exchanged between the air in the air heat exchanger and the combustion exhaust gas. By this, it is possible to raise the temperature of the air from the air heat exchanger to the fuel cell, and thus to raise the temperature of the fuel cell and the temperature of the cathode-off gas. This leads to a rise in the combustion temperature of the combustor, which makes it easy for the combustor to maintain the combustion reaction. Accordingly, the combustion state of the combustor can be improved while the combustor is continuing the combustion. Moreover, the decrease in the amount of steam in the hydrogen-containing gas (hydrogen gas) sent from the reformer to the anode of the fuel cell makes it possible to increase the proportion of the hydrogen gas in the anode-off gas. Thus, the lean burn in which the combustion state of the combustor is unstable is eased, and the combustion temperature of the combustor rises. Accordingly, the combustion state of the combustor can be improved while the combustor is continuing the combustion.

In the fuel cell system of the first aspect, a fuel cell system of a second aspect of the present disclosure further may include an air supplier which supplies the air to the cathode of the fuel cell, in which as the operation of increasing the ratio of the air consumed by the cathode of the fuel cell to the air supplied to the cathode of the fuel cell, the controller controls the air supplier so as to decrease a flow rate of the air supplied to the cathode of the fuel cell.

This configuration makes it possible for the foregoing operation to be appropriately performed by controlling how much to operate the air supplier.

In the fuel cell system of the first aspect, a fuel cell system of a third aspect of the present disclosure further may include a material supplier which supplies the material to the reformer, in which as the operation of decreasing the ratio of the hydrogen-containing gas consumed by the anode of the fuel cell to the hydrogen-containing gas supplied to the anode of the fuel cell, the controller controls the material supplier so as to increase a flow rate of the material supplied to the reformer.

This configuration makes it possible for the foregoing operation to be appropriately performed by controlling how much to operate the material supplier.

In the fuel cell system of the first aspect, a controller according to the a cell system of a fourth aspect of the present disclosure may control the fuel cell system so as to decrease an amount of power generated by the fuel cell, as the operation of decreasing the ratio of the hydrogen-containing gas consumed by the anode of the fuel cell to the hydrogen-containing gas supplied to the anode of the fuel cell.

This configuration makes it possible for the foregoing operation to be appropriately performed by controlling how much to operate the fuel cell system, In the fuel cell system of the first aspect, a fuel cell system of a fifth aspect of the present disclosure further may include a water supplier which supplies the water to the reformer, in which the controller controls the water supplier so as to decrease a flow rate of the water supplied to the reformer.

This configuration makes it possible for the foregoing operation to be appropriately performed by controlling how much to operate the water supplier.

Referring to the accompanying drawings, descriptions will be hereinbelow provided for a first embodiment, first and second examples of the first embodiment, first and second modifications of the first embodiment, as well as a second embodiment of the present disclosure.

The first embodiment, the first and second examples of the first embodiment, the first and second modifications of the first embodiment, as well as the second embodiment which are described below represent examples of the above-discussed aspects. For this reason, shapes, materials, components, arrangement positions and connection modes of the components, steps of operations, sequences of the steps, and the like shown below only provide examples, and are not intended to limit the foregoing aspects unless specifically described in Claims. Any component which is included in the following components and is not recited in the independent Claims providing the most generic concept will be described as optional components. In addition, descriptions for components denoted by the same reference signs in the drawings will be omitted in some cases. Furthermore, drawings schematically illustrate the components in order to make the components easier to understand, and shapes of the components and dimensional ratios among the components are not exactly shown in some drawings. Moreover, the sequence of the steps in each operation may be changed depending on the necessity. Besides, other publicly-known steps may be added to the operation whenever deemed necessary.

First Embodiment

[Apparatus Configuration]

FIG. 1 is a diagram illustrating an example of a fuel cell system of a first embodiment.

As illustrated in FIG. 1, the fuel cell system 100 includes a solid oxide fuel cell 1 (hereinafter abbreviated to SOFC 1), a combustor 2, a reformer 4, an air heat exchanger 7, a material supplier 10, a water supplier 11, an air supplier 12, a hydrogen-containing gas supply route 13, an air supply route 14, an anode-off gas discharge route 15, a cathode-off gas discharge route 16, a flame guide 18, a controller 20 and a first temperature detector 21.

It should be noted that in FIG. 1, "up" and "down" relative to the fuel cell system 100 are represented as illustrated in FIG. 1 for the sake of explanatory convenience; and the gravity is assumed to work from "up" to "down."

By steam-reforming of a material, the reformer 4 generates a hydrogen-containing gas to be supplied to an anode of the SOFC 1. To put it specifically, the reformer 4 includes: a cylinder inner wall 4A; a cylinder outer wall 4B; and a reforming catalyst 4C provided between the cylinder inner wall 4A and the cylinder outer wall 4B. When the material and water are supplied to the reforming catalyst 4C, the reforming catalyst 4C causes the material to undergo steam-reforming reaction, and thereby generates the hydrogen-containing reformed gas. Incidentally, the container of the reformer 4 is constructed from two cylinders which are the cylinder inner wall 4A and the cylinder outer wall 4B. Accordingly, while under a high-temperature condition, the thus-constructed container of the reformer 4 makes it possible for the reformer 4 to withstand thermal stress more appropriately and securely than if the container of the reformer 4 would be shaped like a rectangular cylinder.

The reformer 4 may employ any type of reforming reaction. Examples of the reforming reaction include steam-reforming reaction, and autothermal reforming reaction. Incidentally, generally speaking, at least one selected from a group consisting of nickel and noble metal catalysts such as platinum, ruthenium and rhodium may be used for the reforming catalyst 4C. In the fuel cell system 100 of the embodiment, the stream-reforming reaction on the material is used as the reforming reaction to be performed by the reformer 4, and a catalyst containing ruthenium is used as the reforming catalyst 4C of the reformer 4.

The material supplier 10 supplies the material to the reformer 4. The material supplier 10 may have any configuration as long as it is capable of supplying the material to the reformer 4. The material supplier 10 is a device which controls the flow rate of the material sent to the reformer 4, and may be formed, for example, from both or either of a pressure booster and a flow rate control valve. A constant-volume pump, for example, may be used as the pressure booster. However, the pressure booster is not limited to the constant-volume pump. The material is supplied from a material supply source. The material supply source has a predetermined supply pressure. Examples of the material supply source include a material cylinder and a material infrastructure. Incidentally, the material is a hydrocarbon fuel containing an organic chemical compound made of at least carbon and hydrogen, such as methane-based town gas, natural gas or LPG.

The water supplier 11 supplies the water to the reformer 4. The water supplier 11 may have any configuration as long as it is capable of supplying the water to the reformer 4. The water supplier 11 is a device which controls the flow rate of the water sent to the reformer 4, and may be formed, for example, from both or either of a pressure booster and a flow rate control valve. A constant-volume pump, for example, may be used as the pressure booster. However, the pressure booster is not limited to the constant-volume pump.

As illustrated in FIG. 1, the reformer 4 includes a water evaporation unit 4D located above the reforming catalyst 4C, and formed by the cylinder inner wall 4A and the cylinder outer wall 4B. In other words, the lower portion of the container of the reformer 4 is filled with the reforming catalyst 40, while the water evaporation unit 4D is formed in the upper portion of the container of the reformer 4. Thereby, the water evaporation unit 4D which generates steam to be supplied to the reforming catalyst 4C can be more easily constructed than if the reformer 4 would include no water evaporation unit. The material from the material supplier 10 and the water from the water supplier 11 are sent to the water evaporation unit 4D. The material and the water are mixed together in the water evaporation unit 4D, and thereafter, the mixed gas is supplied to the reforming catalyst 4C.

It should be noted that the water evaporation unit 4D may include a water receiving portion (not illustrated) which temporarily stores the water in the middle of the flow of the water in the water evaporation unit 4D, or a flow path member (not illustrated) which forms a helical flow path. The water receiving portion or the flow path member makes it possible to appropriately evaporate the water in the middle of the water evaporation unit 4D even when the water in the water evaporation unit 4D is dropped in a direction in which the gravity works.

Although not illustrated in FIG. 1 devices needed for the reforming reaction are provided depending on the necessity. For example, in a case where the reforming reaction is the autothermal reaction, the fuel cell system 100 is further provided with devices such as a supplying device which supplies the reformer 4 with air for the reforming reaction.

The air supplier 12 supplies air to a cathode of the SOFC 1. The air supplier 12 may have any configuration as long as it is capable of supplying the air to the cathode of the SOFC 1. The air supplier 12 is a device which controls the flow rate of the air sent to the cathode of the SOFC 1, and may be formed, for example, from a blower, a sirocco fan, or the like.

As illustrated in FIG. 1, the air supplier 12 is connected to the air heat exchanger 7. The air heat exchanger 7 includes a cylindrical inner wall 7A, a cylindrical outer wall 7B, and an air route 70 provided between the cylindrical inner wall 7A and the cylindrical outer wall 7B. The air heat exchanger 7 surrounds the reformer 4, and is arranged coaxially with the reformer 4. In other words, the container of the air heat exchanger 7 is constructed from two cylinders which are the cylindrical inner wall 7A and the cylindrical outer wall 7B. The inside of the container serves as a passage route of the air to be used as a heat receiving fluid of the air heat exchanger 7. The air heated by the air heat exchanger 7 is sent to the cathode of the SOFC 1, and is used for the SOFC 1's power generation. Incidentally, descriptions will be provided for the route of the combustion exhaust gas to be used as a heating fluid of the air heat exchanger 7.

The external forms of the cylindrical inner wall 7A and the cylindrical outer wall 7B of the air heat exchanger 7 may be cylindrical or rectangularly cylindrical. An advantage of the cylindrical shape over the rectangularly cylindrical shape is that the cylindrical inner and outer walls 7A, 7B formed in the cylindrical shape is better in withstanding the thermal stress than the cylindrical inner and outer walls 7A, 7B formed in the rectangularly cylindrical shape. An advantage of the rectangularly cylindrical shape over the cylindrical shape is that the cylindrical inner and outer walls 7A, 7B formed in the rectangularly cylindrical shape makes it easier to cover the air exchanger 7 with a heat insulating material than the cylindrical inner and outer walls 7A, 7B formed in the cylindrical shape.

The SOFC 1 generates power by using the air, supplied to the cathode, and the hydrogen-containing gas, supplied to the anode, as fuel. To put it specifically, the SOFC 1 generates the power by using: the hydrogen-containing gas generated by the reformer 4; and the air passing through the air heat exchanger 7. The SOFC 1 includes a fuel cell stack, which is not illustrated. For example, the fuel cell stack is formed in a flat-plate shape by stacking members such as flat cells and interconnections. Incidentally, the shape of the fuel cell stack is limited to the flat plate.

Furthermore, as illustrated in FIG. 1, the hydrogen-containing gas supply route 13 to be used to supply the hydrogen-containing gas from the reformer 4 to the SOFC 1, the air supply route 14 to be use to supply the air from the air heat exchanger 7 to the SOFC 1, the anode-off gas discharge route 15 to be used to discharge the hydrogen-containing gas not used for the SOFC 1's power generation (anode-off gas) to the combustor 2, and the cathode-off gas discharge route 16 to be used to discharge the air not used for the SOFC 1's power generation (cathode-off gas) to the combustor 2 are connected to the respective appropriate portions of the SOFC 1.

The combustor 2 combusts the anode-off gas discharged from the anode of the SOFC 1 and the cathode-off gas discharged from the cathode of the SOFC 1, and thereby generates the combustion exhaust gas.

As illustrated in FIG. 1, the anode-off gas and the cathode-off gas discharged from the SOFC 1 are sent to the combustor 2 via the anode-off gas discharge route 15 and the cathode-off gas discharge route 16, respectively. The gases are combusted in the combustor 2. Thereby, the high-temperature combustion exhaust gas is generated in a combustion space 8 of the combustor 2.

In the fuel cell system 100 of the embodiment, the combustor 2 is provided outside the SOFC 1. The anode-off gas discharge route 15 and the cathode-off gas discharge route 16 both extending from the SOFC 1 are connected to the respective appropriate portions of the combustor 2. In addition, a flame hole portion (not illustrated) is formed in the combustor 2. The cylindrical flame guide 18 is in contact with a bottom wall portion of the main container which houses the reformer 4, the air heat exchanger 7 and the like (for example, a wall portion of the combustor 2 where the flame hole portion is formed), and is provided vertically upright in a way that directs the flame guide 18 to the periphery of the combustion space 8.

In this respect, as illustrated in FIG. 1, the SOFC 1 is provided at a position along the center axis of the reformer 4, and away from both the reformer 4 and the combustor 2. In addition, the reformer 4 is provided at a position along the center axis of the reformer 4, and away from the combustor 2. Furthermore, the cylinder inner wall 4A of the reformer 4 is arranged along the circumference of the combustion space 8 for the flame which is formed by the combustor 2. In other words, the reformer 4 (the combustion space 8), the combustor 2 and the SOFC 1 are arranged in this order in the up-to-down direction in which the gravity works, and with an appropriate separation distance between each neighboring two of them. Moreover, a combustion exhaust gas route 9 of the combustor 2 is formed by a space between the flame guide 18 and the cylinder inner wall 4A of the reformer 4, a space between the lower end of the reformer 4 and the bottom wall portion of the main container, as well as a space between the cylinder outer wall 4B of the reformer 4 and the cylindrical inner wall 7A of the air heat exchanger 7. To put it specifically, as indicated with arrow dotted lines in FIG. 1, the combustion exhaust gas is guided downward along the flame guide 18 and the reformer 4, thereafter passes the space right under the lower end of the reformer 4, and is eventually guided upward along the reformer 4 and the air heat exchanger 7.

The first temperature detector 21 detects at least one of the temperature of the combustion exhaust gas and the temperature of the combustor 2 (which may be also hereinafter referred to as the combustion temperature of the combustor 2 for the sake of convenience). The first temperature detector 21 may have any configuration as long as it is capable of detecting the combustion temperature of the combustor 2.

The first temperature detector 21 may be provided at any place near the combustor 2. For example, the first temperature detector 21 may be provided at an appropriate place in a space above the flame guide 18.

Otherwise, the first temperature detector 21 may be provided at a place which the flame of the combustor 2 directly hits. The configuration may be such that the first temperature detector 21 detects the temperature of the flame which is formed by the combustor 2.

Otherwise, the first temperature detector 21 may be provided on the combustion exhaust gas route 9 outside the flame guide 18, or at a predetermined place which correlates with the temperature of the combustion exhaust gas (for example, on the outer surface of the cylinder inner wall 4A forming the combustion exhaust gas route 9). In other words, the configuration may be such that the first temperature detector 21 detects the temperature of a high-temperature combustion exhaust gas which has just come out of the flame guide 18.

It should be noted that in the fuel cell system 100 of the embodiment, the first temperature detector 21 is arranged on the combustion exhaust gas route 9 near the outer surface of the flame guide 18. Examples of the first temperature detector 21 include a thermocouple, and a thermistor.

The combustor 2 is provided with a flame starter device such as an igniter and a heater. The combustor 2 has the same configuration as combustors of general fuel cell systems. For this reason, detailed descriptions and illustrations of the combustor 2 are omitted.

If a temperature T1 detected by the first temperature detector 21 is lower than a preset first threshold S1 although the combustor 2 is forming the flame, the controller 20 performs at least one of: an operation of increasing the ratio of the air consumed by the cathode of the SOFC 1 to the air supplied to the cathode thereof; an operation of decreasing the ratio of the hydrogen-containing gas consumed by the anode of the SOFC 1 to the hydrogen-containing gas supplied to the anode thereof; and an operation of decreasing the amount of water supplied to the reformer 4.

To put it specifically, as the operation of increasing the ratio of the air consumed by the cathode of the SOFC 1 to the air supplied to the cathode thereof, the controller 20 may controls the air supplier 12 so as to decrease the flow rate of the air supplied to the cathode of the SOFC 1.

Furthermore, as the operation of decreasing the ratio of the hydrogen-containing gas consumed by the anode of the SOFC 1 to the hydrogen-containing gas supplied to the anode thereof, the controller 20 may controls the material supplier 10 so as to increase the flow rate of the material supplied to the reformer 4.

Otherwise, as the operation of decreasing the ratio of the hydrogen-containing gas consumed by the anode of the SOFC 1 to the hydrogen-containing gas supplied to the anode thereof, the controller 20 may controls the fuel cell system 100 so as to decrease the amount of power generated by the SOFC 1.

Moreover, the controller 20 may control the water supplier 11 so as to decrease the flow rate of the water supplied to the reformer 4.

The controller 20 may have any configuration as long as it is capable of performing the control functions. The controller 20 includes, for example, an arithmetic operation circuit (not illustrated) and a storage circuit (not illustrated) which stores control programs. Examples of the arithmetic operation circuit include a micro processing unit (MPU) and a central processing unit (CPU). Examples of the storage circuit include a memory. The controller 20 may be formed from a single controller which performs centralized control, or from multiple controllers which performs distributed control in cooperation with one another. Furthermore, the controller 20 may be configured to control the run of the fuel cell system 100. In this case, the controller 20 controls the operations of the air supplier 12, the material supplier 10, the water supplier 11, the flame starter device (not illustrated) and the like, for example, based on information such as the temperature of the fuel cell system 100 and the amount of power generated by the SOFC 1. Thus, the controller 20 controls the flow rate of the air, the flow rate of the material and the flow rate of the water, and accordingly runs the fuel cell system 100 appropriately.

[Operation]

Referring to the drawings, descriptions will be hereinbelow provided for an example of how the fuel cell system 100 of the embodiment works.

It should be noted that the below-described working is achieved by the reading of the control programs from the storage circuit by the arithmetic operation circuit of the controller 20. Nevertheless, it is not necessarily essential that the controller 20 perform all of the following working. The operator may perform part or all of the following working.

To begin with, the fuel cell system 100 of the embodiment causes the material to undergo the steam-reforming reaction. To this end, the reformation water is supplied from the water supplier 11 to the water evaporation unit 4D. The water evaporation unit 4D generates the steam. The water evaporation unit 4D mixes the steam and the material from the material supplier 10. At this time, the water evaporation unit 4 heats the material. The mixed gas is set to the space provided with the reforming catalyst 40. Thus, in the reforming catalyst 40, the steam-reforming reaction on the material progresses, and the hydrogen-containing gas (reformed gas) is accordingly generated. The hydrogen-containing gas is supplied to the SOFC 1 via the hydrogen-containing gas supply route 13.

Meanwhile, the air from the air supplier 12 is sent to the air heat exchanger 7. In the air heat exchanger 7, the air is heated through heat exchange between the air and the combustion exhaust gas flowing in the combustion exhaust gas route 9. Thereafter, the resultant air is supplied to the SOFC 1 via the air supply route 14.

The SOFC 1 generates power by using the hydrogen-containing gas and the air as fuel. The hydrogen-containing gas and the air which have not been used for the SOFC 1's power generation (the anode-off gas and the cathode-off gas) are sent to the combustor 2 via the anode-off gas discharge route 15 and the cathode-off gas discharge route 16, respectively.

The combustor 2 combusts the anode-off gas and the cathode-off gas, and thereby forms the flame which goes to the combustion space 8.

At this time, as indicated with the arrow dotted lines in FIG. 1, the high-temperature combustion exhaust gas generated by the combustor 2 is discharged through the upper opening of the flame guide 18, and passes through the space between the flame guide 18 and the cylinder inner wall 4A of the reformer 4. Thereby, the reforming catalyst 4C of the reformer 4 is appropriately heated by the heat of the combustion exhaust gas and the radiant heat from the flame guide 18. Furthermore, because the high-temperature combustion exhaust gas heats the reformer 4 which is located downstream in the direction of the flow of the hydrogen-containing gas, the gas outlet of the reforming catalyst 4C and its vicinity can be heated to high temperature as well. Accordingly, the reforming reaction (endothermic reaction) progresses effectively, and the hydrogen-containing gas which contains ample hydrogen can be generated.

Thereafter, the combustion exhaust gas passes through the space between the lower end of the reformer 4 and the bottom wall portion of the main container, and subsequently passes through the space between the lower portion of the cylinder outer wall 4B of the reformer 4 (the portion thereof provided with the reforming catalyst 4C) and the cylindrical inner wall 7A of the air heat exchanger 7. Thereby, the reforming catalyst 4C of the reformer 4 can be appropriately heated with the heat of the combustion exhaust gas. Furthermore, the air in the downstream side of the air heat exchanger 7 can be appropriately heated (pre-heated) with the heat of the combustion exhaust gas. At this time, because the flow of the air in the air heat exchanger 7 and the mixed gas in the reformer 4 is opposite to the flow of the combustion exhaust gas, heat exchange performance is higher than if the flows of the two fluids would be parallel or orthogonal to each other. Accordingly, the air and the mixed gas can be efficiently heated.

After that, the combustion exhaust gas passes through the space between the upper portion of the cylinder outer wall 4B of the reformer 4 (the portion thereof provided with the water evaporation unit 4D) and the cylindrical inner wall 7A of the air heat exchanger 7. In other words, the combustion exhaust gas passes around the water evaporation unit 4D. Thereby, the water evaporation unit 4D can be appropriately heated with the heat of the combustion exhaust gas. Furthermore, the air in the upstream side of the air heat exchanger 7 can be appropriately heated (pre-heated) with the heat of the combustion exhaust gas.

The temperature is lower, particularly, in the water evaporation unit 4D and the vicinity of the inlet of the air heat exchanger 7. Thus, the heat is exchanged between the gas flowing there and the combustion exhaust gas passing around the lower portion of the cylinder outer wall 4B. Thereby, the heat of the combustion exhaust gas can be used effectively. To put it specifically, since the appropriate temperature becomes lower in the vicinity of the gas outlet of the reformer 4, the vicinity of the gas outlet of the air heat exchanger 7, and the water evaporation unit 4D in this order, the above-discussed flow the combustion exhaust gas makes it possible to use the heat of the combustion exhaust gas in a cascading way. Accordingly, it is possible to construct the fuel cell system 100 which is capable of producing electric energy with high efficiency from the input energy of the material.

It should be noted that the combustion exhaust gas having passed around the water evaporation unit 4D is discharged to the outside of the fuel cell system 100 via a combustion exhaust gas discharge route (not illustrated).

In this respect, the fuel cell system 100 of the embodiment performs the following operations while the combustor 2 is forming the flame.

Figure 2:
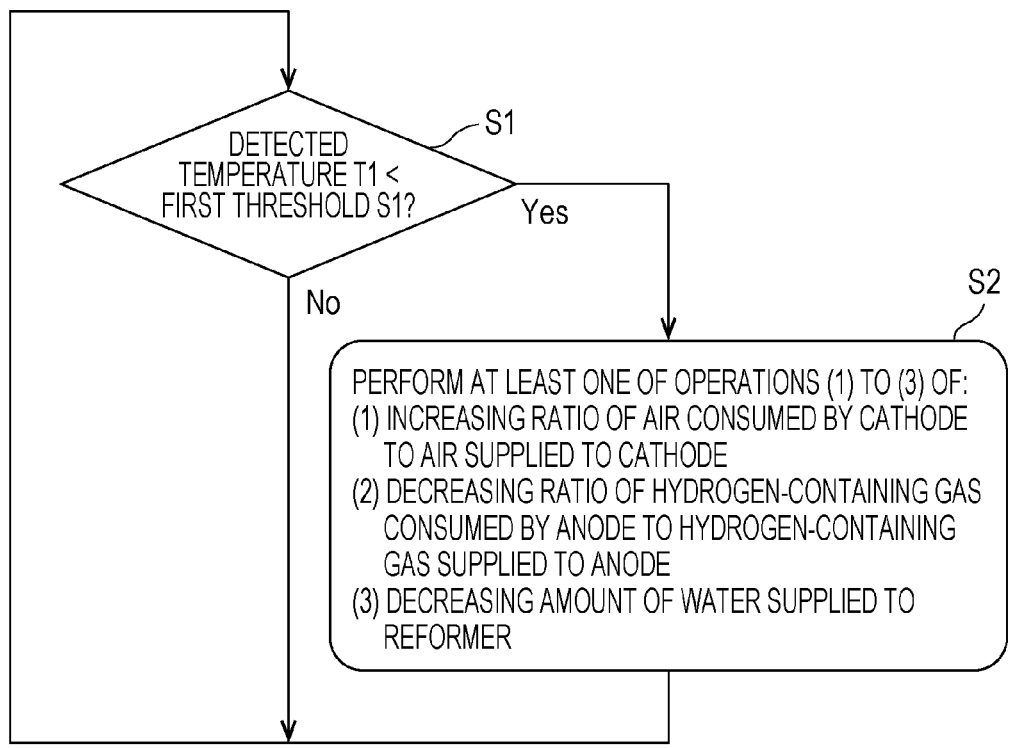
FIG. 2 is a flowchart illustrating an example of how the fuel cell system of the first embodiment operates (runs)

FIG. 2 is a flowchart illustrating an example of how the fuel cell system of the first embodiment operates (runs).

First of all, while the combustor 2 is forming the flame, the first temperature detector 21 detects the combustion temperature of the combustor 2, and it is determined whether a temperature T1 detected by the first temperature detector 21 is lower than the preset first threshold S1 (step S1). Incidentally, it is known that while the combustion state of the combustor 2 is in an unstable area, there exists a correlation between the combustion temperature of the combustor 2 and the concentration of a carbon monoxide gas in the combustion exhaust gas. For this reason, once the correlation between the combustion state of the combustor 2 (for example, the concentration of carbon monoxide in the combustion exhaust gas) and the temperature T1 detected by the first temperature detector 21 is found (measured) in advance, it is possible to estimate a combustion temperature at which the combustor 2 is kept in a steady combustion state (for example, a state in which the concentration of carbon monoxide in the combustion exhaust gas is not equal to or higher than a predetermined value). With this taken into consideration, for step S1, the first threshold S1 is set at a combustion temperature at which the combustor 2 is expected to produce carbon monoxide to an extent that its concentration in the combustion exhaust gas is at the predetermined value. The first threshold S1 is used to compare and determine the temperature T1 detected by the first temperature detector 21. The first threshold S1 may be, for example, a combustion temperature of the combustor 2 at which the concentration of carbon monoxide in the combustion exhaust gas is expected to start to increase. However, the first threshold S1 is not limited to this.

If in step S1, the temperature T1 detected by the first temperature detector 21 is equal to or higher than the first threshold S1, the fuel cell system 100 continues its operation as it is, and the fuel cell system 100 resumes performing the operation of step S1 whenever deemed necessary.

If in step S1, the temperature T1 detected by the first temperature detector 21 is lower than the first threshold S1, the fuel cell system 100 performs, in step S2, at least one of: the operation of increasing the ratio of the air consumed by the cathode of the SOFC 1 to the air supplied to the cathode thereof; the operation of decreasing the ratio of the hydrogen-containing gas consumed by the anode of the SOFC 1 to the hydrogen-containing gas supplied to the anode thereof; and the operation of decreasing the amount of water supplied to the reformer 4.

To put it specifically, as an example of the operation of increasing the ratio of the air consumed by the cathode of the SOFC 1 to the air supplied to the cathode thereof, the air supplier 12 may be controlled so as to decrease the flow rate of the air supplied to the cathode of the SOFC 1.

Furthermore, as an example of the operation of decreasing the ratio of the hydrogen-containing gas consumed by the anode of the SOFC 1 to the hydrogen-containing gas supplied to the anode thereof, the material supplier 10 may be controlled so as to increase the flow rate of the material supplied to the reformer 4. Furthermore, as another example of the operation of decreasing the ratio of the hydrogen-containing gas consumed by the anode of the SOFC 1 to the hydrogen-containing gas supplied to the anode thereof, the fuel cell system 100 may be controlled so as to decrease the amount of power generated by the SOFC 1.

Moreover, as an example of the operation of decreasing the amount of water supplied to the reformer 4, the water supplier 11 may be controlled so as to decrease the flow rate of water supplied to the reformer 4.

Because of the above operation, while the combustor 2 is forming the flame, the fuel cell system 100 and the method of running the fuel cell system 100 of the embodiment are capable of making the combustion state of the combustor 2 more stable than ever. Thereby, the combustion state of the combustor 2 can be improved while the combustor 2 is continuing its combustion. Thus, damage on the electrolyte (ceramic) of the SOFC 1 which is caused by a rapid change in the temperature of the SOFC 1 can be more inhibited than ever. Accordingly, the durability of the fuel cell system 100 can be improved.

In other words, as during the lean burn, the combustion state of the combustor 2 gets closer to a flameout area where the flame of the combustor 2 is extinguished, the combustion state of the combustor 2 becomes more unstable, and the combustion temperature of the combustor 2 becomes lower. With this taken into consideration, the first threshold S1 is set in advance at a combustion temperature at which the combustor 2 can keep the steady combustion state. Accordingly, if the temperature T1 detected by the first temperature detector 21 is lower than the first threshold S1 although the combustor 2 is forming the flame, at least one of the foregoing operations is performed.

To put it specifically, since the combustor 2 combusts the anode-off gas discharged from the anode of the SOFC 1 and the cathode-off gas discharged from the cathode of the SOFC 1, there is likelihood that the amount of cathode-off gas (air) sent to the combustor 2 becomes greater than the amount of anode-off gas sent to the combustor 2. In this case, the combustion state of the combustor 2 is more likely to get into an unstable lean-burn condition.

To counter the likelihood, if the temperature T1 detected by the first temperature detector 21 is lower than the first threshold S1, the fuel cell system 100 and the method of running the fuel cell system 100 of the embodiment perform the operation of increasing the ratio of the air consumed by the cathode of the SOFC 1 to the air supplied to the cathode of the SOFC 1, and thereby can decrease the amount of cathode-off gas sent to the combustor 2. This decrease makes the amount of cathode-off gas smaller than the amount of anode-off gas. Thus, the lean burn in which the combustion state of the combustor 2 is unstable is eased, and the combustion temperature of the combustor 2 rises. Accordingly, the combustion state of the combustor 2 can be improved while the combustor 2 is continuing the combustion.

Furthermore, the system and the method perform the operation of decreasing the ratio of the hydrogen-containing gas consumed by the anode of the SOFC 1 to the hydrogen-containing gas supplied to the anode of the SOFC 1, and thereby can increase the amount of anode-off gas sent to the combustor 2. This increase makes the amount of anode-off gas larger than the amount of cathode-off gas. Thus, the lean burn in which the combustion state of the combustor 2 is unstable is eased, and the combustion temperature of the combustor 2 rises. Accordingly, the combustion state of the combustor 2 can be improved while the combustor 2 is continuing the combustion.

Moreover, the system and the method perform the operation of decreasing the amount of water supplied to the reformer 4, and thereby can decrease the amount of steam in the hydrogen-containing gas (hydrogen gas) sent from the reformer 4 to the anode of the SOFC 1. This decrease makes it possible to decrease the quantity of heat which the reformer 4 needs from the combustion exhaust gas to evaporate the water, and thereby increases the amount of heat exchanged between the air in the air heat exchanger 7 and the combustion exhaust gas. By this, it is possible to raise the temperature of the air from the air heat exchanger 7 to the SOFC 1, and thus to raise the temperature of the SOFC 1 and the temperature of the cathode-off gas. This leads to a rise in the combustion temperature of the combustor 2, which makes it easy for the combustor 2 to maintain the combustion reaction. Accordingly, the combustion state of the combustor 2 can be improved while the combustor 2 is continuing the combustion. Moreover, the decrease in the amount of steam in the hydrogen-containing gas (hydrogen gas) sent from the reformer 4 to the anode of the SOFC 1 makes it possible to increase the proportion of the hydrogen gas in the anode-off gas. Thus, the lean burn in which the combustion state of the combustor 2 is unstable is eased, and the combustion temperature of the combustor 2 rises. Accordingly, the combustion state of the combustor 2 can be improved while the combustor 2 is continuing the combustion.

In this way, the fuel cell system 100 and the method of running the fuel cell system 100 of the embodiment perform the operation of: detecting the combustion temperature of the combustor 2 using the first temperature detector 21; and comparing the temperature T1 detected by the first temperature detector 21 with the first threshold S1; and thereby inhibiting the decrease in the combustion temperature of the combustor 2.

First Example

Figure 3:
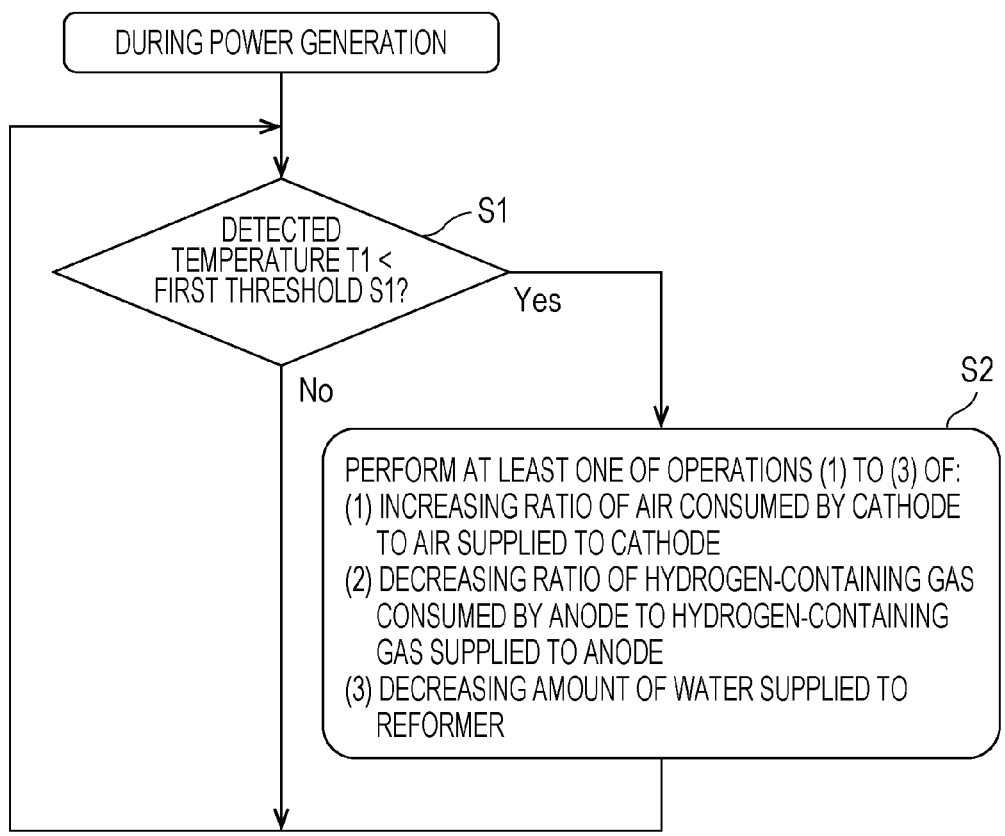
FIG. 3 is a flowchart illustrating an example of how a fuel cell system of a first example of the first embodiment operates.

FIG. 3 is a flowchart illustrating an example of how a fuel cell system of a first example of the first embodiment operates.

The fuel cell system 100 of this example is the fuel cell system 100 of the first embodiment in which if the temperature T1 detected by the first temperature detector 21 is lower than the first threshold S1 although the SOFC 1 is generating power, the controller 20 performs at least one of: the operation of increasing the ratio of the air consumed by the cathode of the SOFC 1 to the air supplied to the cathode thereof; the operation of decreasing the ratio of the hydrogen-containing gas consumed by the anode of the SOFC 1 to the hydrogen-containing gas supplied to the anode thereof; and the operation of decreasing the amount of water supplied to the reformer 4. Incidentally, the specific examples of what are controlled by the controller 20 for the operation in step S2 in FIG. 3 are the same as those of the first embodiment, and descriptions for them will be omitted. In addition, steps S1 and S2 in FIG. 3 are the same as those in FIG. 2, and detailed descriptions for the steps will be omitted.

While the SOFC 1 is generating power, the fuel cell system 100 of this example detects the combustion temperature of the combustor 2 using the first temperature detector 21, compares the temperature T1 detected by the first temperature detector 21 with the first threshold S1, and makes the determination. If the temperature T1 detected by the first temperature detector 21 is lower than the first threshold S1, the fuel cell system 100 performs, in step S2, the operation of inhibiting the decrease in the combustion temperature of the combustor 2.

Thereby, the combustion state of the combustor 2 becomes stable while the SOFC 1 is generating power. Thus, the fuel cell system 100 can be run for the power generation with the durability of the SOFC 1 taken into consideration. To put it specifically, if the combustor 2 loses the flame, no hydrogen-containing gas can be supplied to the anode of the SOFC 1, and no air to be sent to the cathode of the SOFC 1 can be heated. In this case, the SOFC 1 can no longer continue the power generation. Thus, the fuel cell stack in the SOFC 1 cools rapidly and becomes highly likely to suffer from thermal distortion, since the fuel cell stack in the SOFC 1 has been in a high-temperature state while the fuel cell system 100 is generating power.

Particularly, the electrolyte (ceramic) of the SOFC 1 is vulnerable to thermal distortion. Repeated loss of the flame in the combustor 2 would pose a risk that: the electrolyte is damaged; and the fuel cell system 100 becomes no longer able to continue the normal power generating operation. The fuel cell system 100 of this example, however, can reduce such a risk since the fuel cell system 100 is capable of stabilizing the combustion state of the combustor 2 by performing at least one of the foregoing operations. Furthermore, there would be likelihood that the amount of carbon monoxide gas increases in the combustion exhaust gas while the combustor 2 is in the process of losing the flame. In contrast, the fuel cell system 100 of this example can reduce such a risk by performing at least one of the foregoing operations.

The fuel cell system 100 and the method of running the fuel cell system 100 of this example may be the same as the fuel cell system 100 and the method of running the fuel cell system 100 of the first embodiment, except for the above-discussed feature.

Second Example

Figure 4:
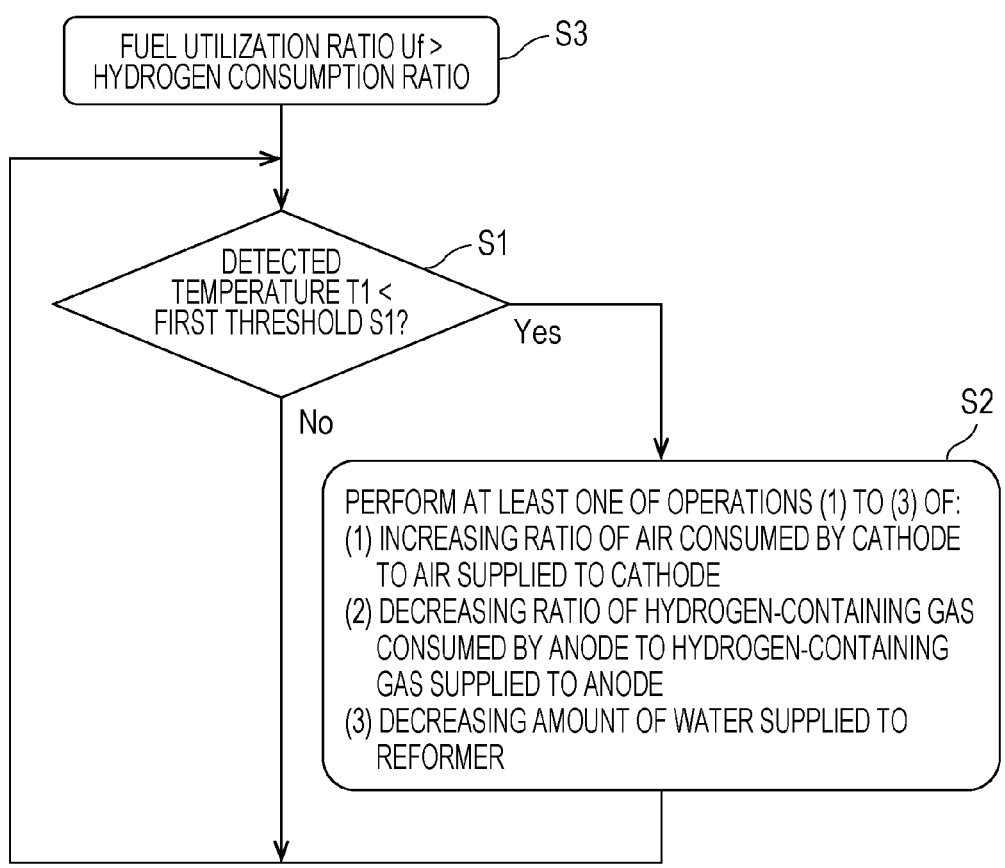
FIG. 4 is a flowchart illustrating an example of how a fuel cell system of a second example of the first embodiment operates.

FIG. 4 is a flowchart illustrating an example of how a fuel cell system of a second example of the first embodiment operates.

The fuel cell system 100 of this example is the fuel cell system 100 of the first embodiment or the first example of the first embodiment in which if a hydrogen consumption ratio of the hydrogen-containing gas consumed by the anode of the SOFC 1 to the hydrogen-containing gas supplied to the anode thereof is higher than a preset hydrogen consumption ratio, the controller 20 performs at least one of: the operation of increasing the ratio of the air consumed by the cathode of the SOFC 1 to the air supplied to the cathode thereof; the operation of decreasing the ratio of the hydrogen-containing gas consumed by the anode of the SOFC 1 to the hydrogen-containing gas supplied to the anode thereof; and the operation of decreasing the amount of water supplied to the reformer 4. Incidentally, the specific examples of what are controlled by the controller 20 for the operation in step S2 in FIG. 4 are the same as those of the first embodiment, and descriptions for them will be omitted. In addition, steps S1 and S2 in FIG. 4 are the same as those in FIG. 2, and detailed descriptions for the steps will be omitted.

In this respect, the fuel cell system 100 would be able to be run with high efficiency by increasing the amount of hydrogen gas used by the anode of the SOFC 1. To put it specifically, if a fuel utilization ratio $U_f$ of the SOFC 1 (a ratio of an amount of hydrogen gas used for the power generation by the SOFC 1 to an amount of hydrogen gas supplied to the SOFC 1 which is expressed by 1) would exceed the preset hydrogen consumption ratio, the fuel cell system 100 would be able to be temporarily run with high efficiency. However, a higher fuel utilization ratio $U_f$ of the SOFC 1 means an inevitable decrease in the amount of anode-off gas sent to the combustor 2. As a result, the combustor 2 would be more likely to get into lean burn in which the amount of cathode-off gas is larger than the amount of anode-off gas. In other words, an increase in the air ratio in the combustion of the combustor 2 would get the flame formed by the combustor 2 closer to the flameout area in which the flame cannot be normally maintained by the combustor 2.

With this taken into consideration, for the purpose of a high-efficiency run (step S3), the fuel cell system 100 of this example proceeds to step S1, where the fuel cell system 100 detects the combustion temperature of the combustor 2 using the first temperature detector 21, compares the temperature T1 detected by the first temperature detector 21 with the first threshold S1, and makes the determination. If the temperature T1 detected by the first temperature detector 21 is lower than the first threshold S1, the fuel cell system 100 performs, in step S2, the operation of inhibiting the decrease in the combustion temperature of the combustor 2.

Because of the above operation, although high-efficiency operation of the fuel cell system 100 makes the combustor 2 more likely to get into the lean burn, the fuel cell system 100 is capable of stabilizing the combustion state of the combustor 2 by performing at least one of the foregoing operations. Thereby, the fuel cell system 100 can reduce a risk that the decrease in the combustion temperature of the combustor 2 worsens the combustion state of the combustor 2 and makes it difficult for the combustor 2 to maintain the combustion reaction appropriately.

The fuel cell system 100 and the method of running the fuel cell system 100 of this example may be the same as the fuel cell system 100 and the method of running the fuel cell system 100 of the first embodiment or the first example of the first embodiment, except for the above-discussed feature.

(First Modification)

Figure 5:
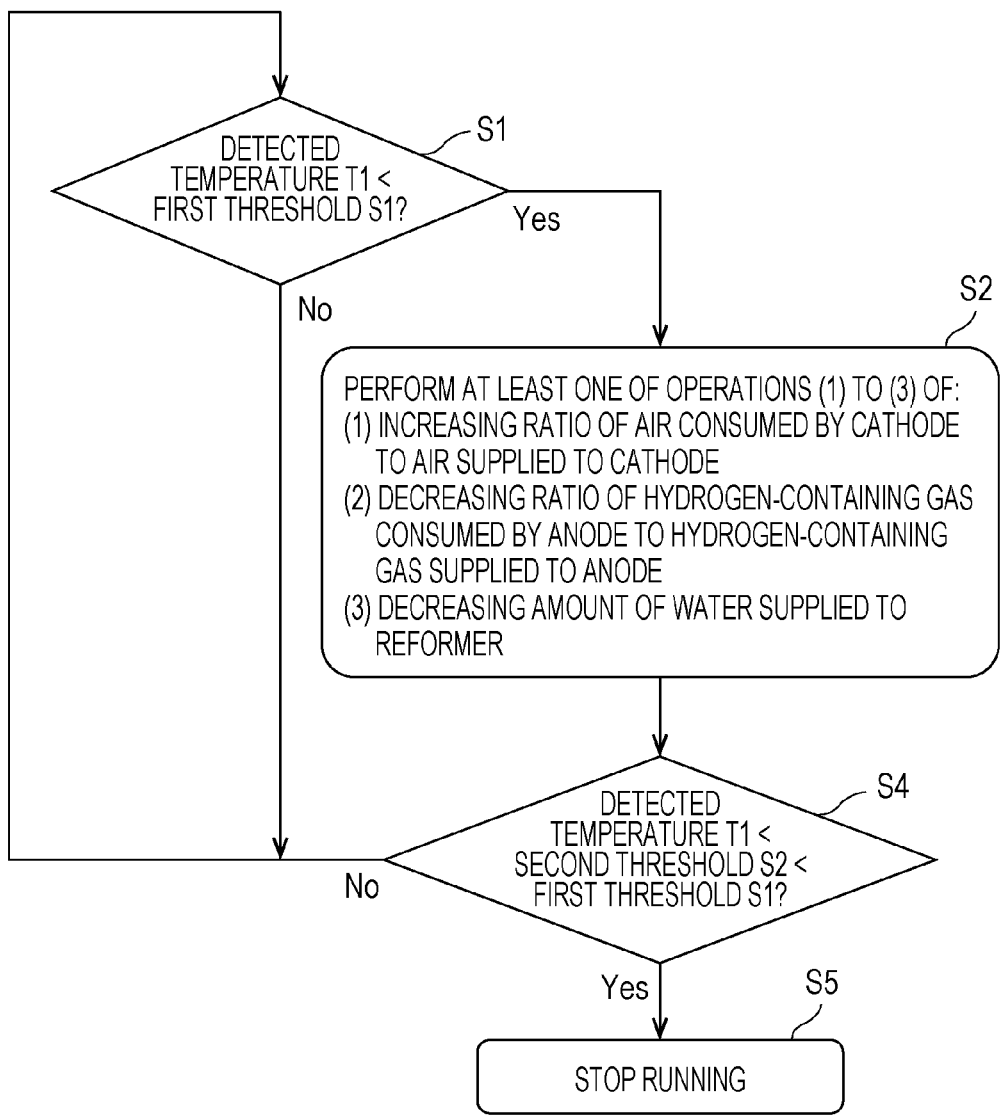
FIG. 5 is a flowchart illustrating an example of how a fuel cell system of a first modification of the first embodiment operates.

FIG. 5 is a flowchart illustrating an example of how a fuel cell system of a first modification of the first embodiment operates.

The fuel cell system 100 of this modification is the fuel cell system 100 of any one of the first embodiment as well as the first and second examples of the first embodiment in which: if the temperature T1 detected by the first temperature detector 21 is lower than the first threshold S1, the controller 20 performs at least one of the operation of increasing the ratio of the air consumed by the cathode of the SOFC 1 to the air supplied to the cathode thereof, the operation of decreasing the ratio of the hydrogen-containing gas consumed by the anode of the SOFC 1 to the hydrogen-containing gas supplied to the anode thereof, and the operation of decreasing the amount of water supplied to the reformer 4; and thereafter, if the temperature T1 detected by the first temperature detector 21 is lower than a second threshold S2 set in advance at a temperature lower than the first threshold S1, the controller 20 stops the run of the fuel cell system 100.

It should be noted that the specific examples of what are controlled by the controller 20 for the operation in step S2 in FIG. 5 are the same as those of the first embodiment. For this reason, descriptions for them will be omitted. In addition, steps S1 and S2 in FIG. 5 are the same as those in FIG. 2, and detailed descriptions for the steps will be omitted.

The fuel cell system 100 of this modification performs the operation of inhibiting the decrease in the combustion temperature of the combustor 2 in step S2. Thereafter, while the combustor 2 is forming the flame, the fuel cell system 100 detects the combustion temperature of the combustor 2 using the first temperature detector 21, and determines whether the temperature T1 detected by the first temperature detector 21 is lower than the preset second threshold S2 (step S4). As discussed above, once the correlation between the combustion state of the combustor 2 (for example, the concentration of carbon monoxide in the combustion exhaust gas) and the temperature T1 detected by the first temperature detector 21 is found (measured) in advance, it is possible to estimate the combustion temperature at which the combustor 2 is kept in the steady combustion state (for example, the state in which the concentration of carbon monoxide in the combustion exhaust gas is not equal to or higher than the predetermined value). With this taken into consideration, for step S4, the second threshold S2 is set at a temperature lower than the first threshold S1 and equal to a combustion temperature at which the combustor 2 is expected to produce carbon monoxide to an extent that its concentration in the combustion exhaust gas quickly increases to a predetermined value because of a worse combustion state of the combustor 2 than in step S1. The second threshold S2 is used to compare and determine the temperature T1 detected by the first temperature detector 21. The second threshold S2 may be, for example, a combustion temperature of the combustor 2 at which the concentration of carbon monoxide in the combustion exhaust gas is expected to be so high as to require the combustor 2 to be stopped. However, the second threshold S2 is not limited to this.

If the temperature T1 detected by the first temperature detector 21 is equal to or higher than the second threshold 32, the fuel cell system 100 continues its operation as it is, and resumes performing the operation of step S1 whenever deemed necessary.

If the temperature T1 detected by the first temperature detector 21 is lower than the second threshold S2, the fuel cell system 100 stops its operation (step S5).

Because of the above operation, the fuel cell system 100 is capable of adequately performing the stop operation if the temperature T1 detected by the first temperature detector 21 is lower than the second threshold S2.

To put it specifically, if the temperature T1 detected by the first temperature detector 21 is lower than the second threshold S2, there is likelihood that the combustor 2 loses the flame. If the combustor 2 would lose the flame suddenly, the temperature of the fuel cell stack in the SOFC 1 would be likely to change rapidly. The fuel cell system 100 of this modification, however, can reduce such a risk since the fuel cell system 100 is capable of appropriately performing the stop operation in accordance with the predetermined sequence.

Furthermore, if the temperature T1 detected by the first temperature detector 21 is lower than the second threshold S2, some trouble may have occurred in the material supplier 10, the water supplier 11, the air supplier 12 or the like. If the fuel cell system 100 would continue its operation as it is, the fuel cell system 100 would be likely to break down. The fuel cell system 100 of this modification, however, can reduce such a risk since the fuel cell system 100 is capable of appropriately performing the stop operation in accordance with the predetermined sequence.

The fuel cell system 100 and the method of running the fuel cell system 100 of this modification may be the same as the fuel cell system 100 and the method of running the fuel cell system 100 in any one of the first embodiment as well as the first and second examples of the first embodiment, except for the above-discussed feature. For example, like in the second example, the operation of the fuel cell system 100 of this modification may be performed if the hydrogen consumption ratio of the hydrogen-containing gas consumed by the anode of the SOFC 1 to the hydrogen-containing gas supplied to the anode thereof is higher than the preset hydrogen consumption ratio.

(Second Modification)

Figure 6:
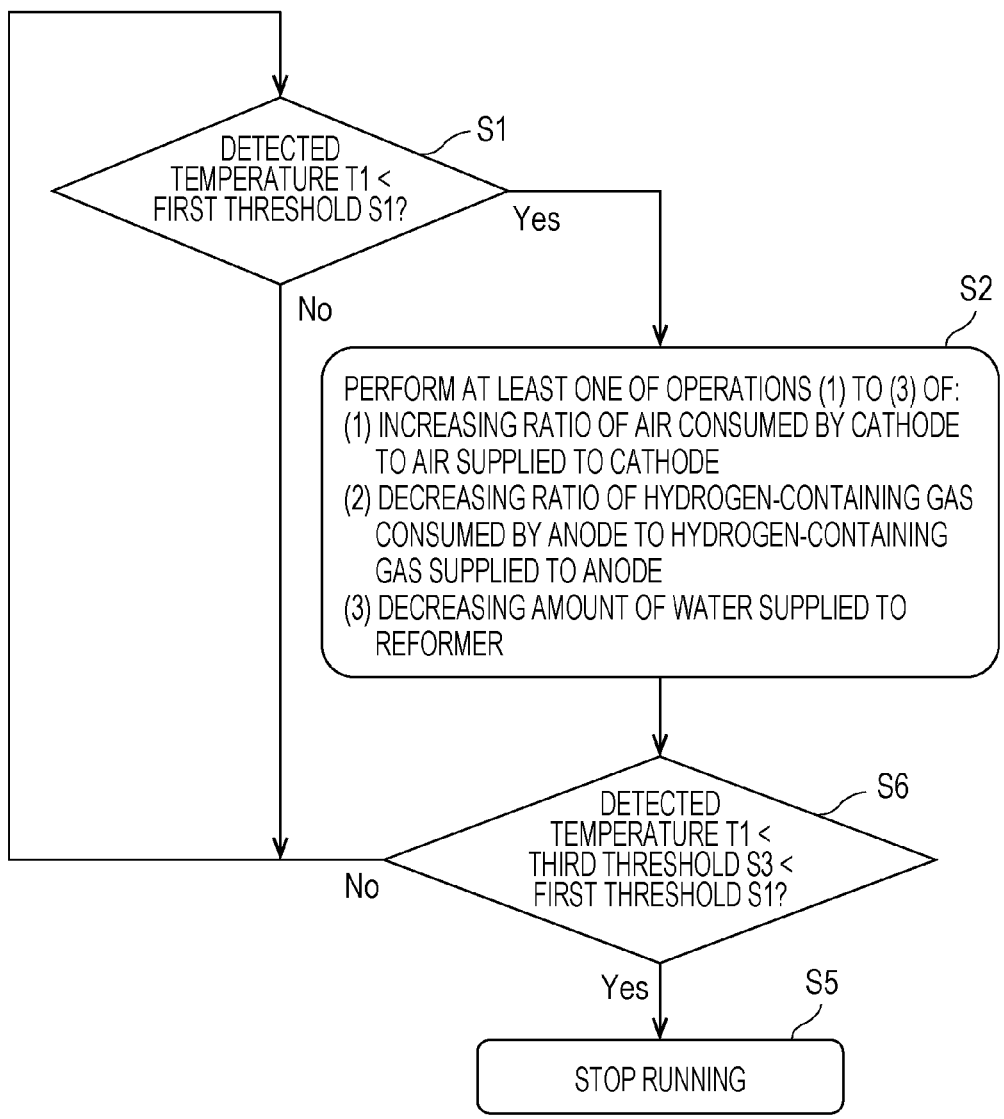
FIG. 6 is a flowchart illustrating an example of how a fuel cell system of a second modification of the first embodiment operates.

FIG. 6 is a flowchart illustrating an example of how a fuel cell system of a second modification of the first embodiment operates.

The fuel cell system 100 of this modification is the fuel cell system 100 of any one of the first embodiment as well as the first and second examples of the first embodiment in which: if the temperature T1 detected by the first temperature detector 21 is lower than the first threshold S1, the controller 20 performs at least one of the operation of increasing the ratio of the air consumed by the cathode of the SOFC 1 to the air supplied to the cathode thereof, the operation of decreasing the ratio of the hydrogen-containing gas consumed by the anode of the SOFC 1 to the hydrogen-containing gas supplied to the anode thereof, and the operation of decreasing the amount of water supplied to the reformer 4; and thereafter, if the temperature T1 detected by the first temperature detector 21 is a temperature lower than the first threshold S1, and is lower than a third threshold S3 which is set in advance at a temperature beyond which the combustor 2 loses the flame, the controller 20 stops the run of the fuel cell system 100.

It should be noted that the specific examples of what are controlled by the controller 20 for the operation in step S2 in FIG. 6 are the same as those of the first embodiment. For this reason, descriptions for them will be omitted. In addition, steps S1 and S2 in FIG. 6 are the same as those in FIG. 2, and detailed descriptions for the steps will be omitted.

The fuel cell system 100 of this modification performs the operation of inhibiting the decrease in the combustion temperature of the combustor 2 in step S2. Thereafter, while the combustor 2 is forming the flame, the fuel cell system 100 detects the combustion temperature of the combustor 2 using the first temperature detector 21, and determines whether the temperature T1 detected by the first temperature detector 21 is lower than the preset third threshold S3 (step S6). For step S6, the third threshold S3 is set at the temperature which is lower than the first threshold S1, and beyond which the combustor 2 loses the flame because of a worse combustion state of the combustor 2 than in step S1. The third threshold S3 is used to compare and determine the temperature T1 detected by the first temperature detector 21.

If the temperature T1 detected by the first temperature detector 21 is equal to or higher than the third threshold S3, the fuel cell system 100 continues its operation as it is, and resumes performing the operation of step S1 whenever deemed necessary.

If the temperature T1 detected by the first temperature detector 21 is lower than the third threshold S3, the fuel cell system 100 stops its operation (step S5).

Because of the above operation, the fuel cell system 100 is capable of adequately performing the stop operation if the temperature T1 detected by the first temperature detector 21 is lower than the third threshold S3.

To put it specifically, if the temperature T1 detected by the first temperature detector 21 is lower than the third threshold S3, the combustor 2 loses the flame immediately thereafter. If the combustor 2 would lose the flame suddenly, the temperature of the fuel cell stack in the SOFC 1 would be likely to change rapidly. The fuel cell system 100 of this modification, however, can reduce such a risk since the fuel cell system 100 is capable of stopping appropriately in accordance with the predetermined sequence.

Furthermore, if the temperature T1 detected by the first temperature detector 21 is lower than the third threshold S3, some trouble may have occurred in the material supplier 10, the water supplier 11, the air supplier 12 or the like. If the fuel cell system 100 would continue its operation as it is, the fuel cell system 100 would be likely to break down. The fuel cell system 100 of this modification, however, can reduce such a risk since the fuel cell system 100 is capable of appropriately performing the stop operation in accordance with the predetermined sequence.

The fuel cell system 100 and the method of running the fuel cell system 100 of this modification may be the same as the fuel cell system 100 and the method of running the fuel cell system 100 in any one of the first embodiment as well as the first and second examples of the first embodiment, except for the above-discussed feature. For example, like in the second example, the operation of the fuel cell system 100 of this modification may be performed if the hydrogen consumption ratio of the hydrogen-containing gas consumed by the anode of the SOFC 1 to the hydrogen-containing gas supplied to the anode thereof is higher than the preset hydrogen consumption ratio.

Second Embodiment

The inventors have eagerly examined problems involved in the operation of increasing the ratio of the air consumed by the cathode of the SOFC 1 to the air supplied to the cathode thereof, and obtains the following findings.

Because of its high-temperature operation, the solid oxide fuel cell system 100 is configured to inhibit a rise in temperature of the SOFC 1 by collecting heat which is produced while the SOFC 1 is generating power, by use of air to be used for the power generation. For this reason, the decrease in the flow rate of the air supplied to the cathode of the SOFC 1 results in a rise in the operating temperature of the SOFC 1. If the operating temperature of the SOFC 1 rises excessively, even the solid oxide fuel cell system 100 becomes more likely to lower the power generation performance during a long-term operation since the excessive temperature rise thermally degrades the electrolyte of the SOFC 1, peripheral members and the like.

With this taken into consideration, the fuel cell system 100 of the second embodiment is the fuel cell system of any one of the first embodiment, the first and second examples of the first embodiments, as well as the first and second modifications of the first embodiment, in which: the fuel cell system 100 includes a second temperature detector 22 which detects a temperature of the SOFC 1; and if the temperature T1 detected by the first temperature detector 21 is lower than the first threshold S1, the controller 20 performs the operation of increasing the ratio of the air consumed by the cathode of the SOFC 1 to the air supplied to the cathode thereof such that the temperature T2 detected by the second temperature detector 22 does not exceed a preset fourth threshold S4.

Figure 7:
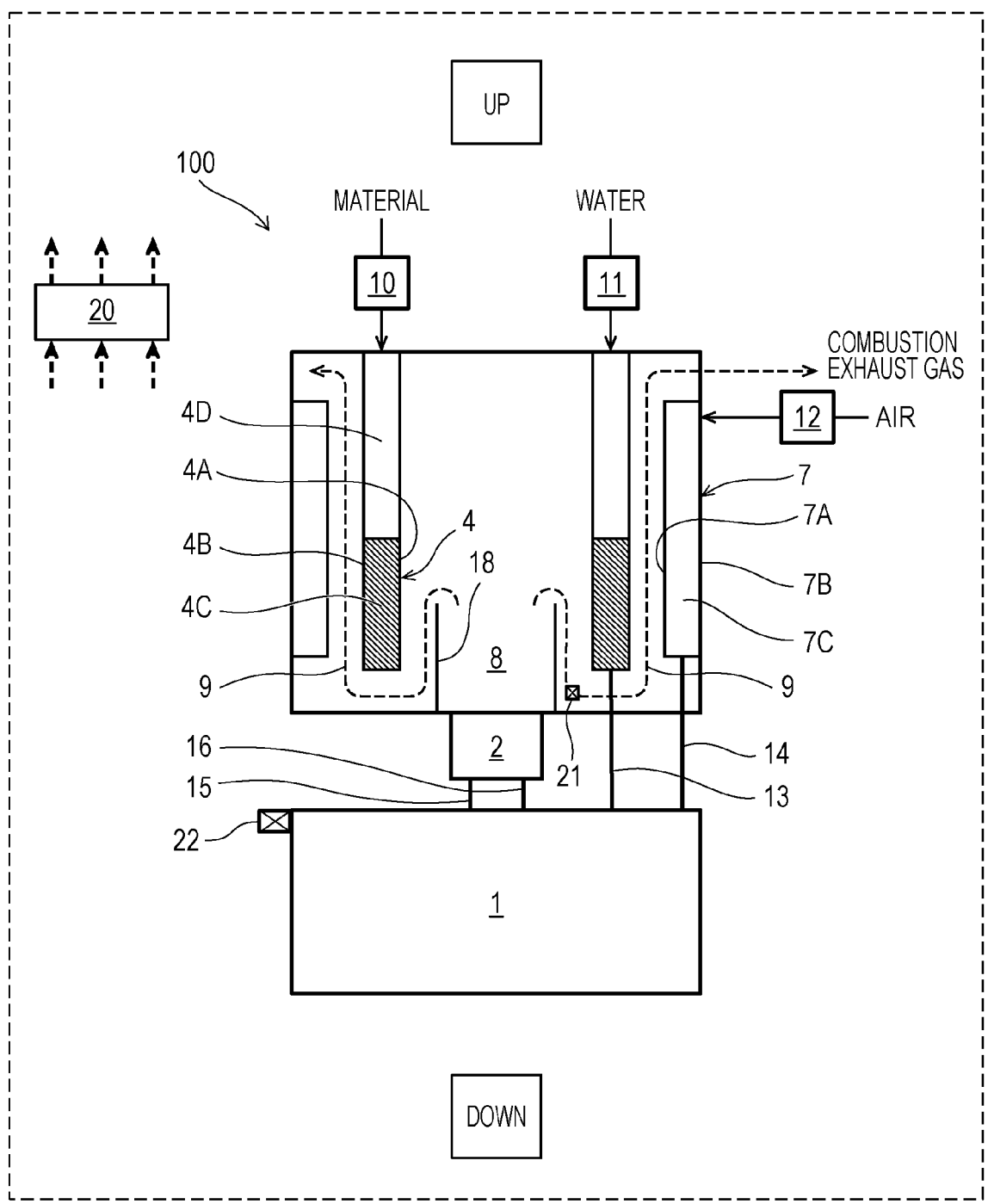
FIG. 7 is a diagram illustrating an example of a fuel cell system of a second embodiment.

FIG. 7 is a diagram illustrating an example of the fuel cell system of the second embodiment.

As illustrated in FIG. 7, the fuel cell system 100 includes the SOFC 1, the combustor 2, the reformer 4, the air heat exchanger 7, the material supplier 10, the water supplier 11, the air supplier 12, the hydrogen-containing gas supply route 13, the air supply route 14, the anode-off gas discharge route 15, the cathode-off gas discharge route 16, the flame guide 18, the controller 20, the first temperature detector 21, and the second temperature detector 22. Incidentally, the SOFC 1, the combustor 2, the reformer 4, the air heat exchanger 7, the material supplier 10, the water supplier 11, the air supplier 12, the hydrogen-containing gas supply route 13, the air supply route 14, the anode-off gas discharge route 15, the cathode-off gas discharge route 16, the flame guide 18, and the first temperature detector 21 are the same as those of the first embodiment. For this reason, descriptions for them will be omitted.

As discussed above, the second temperature detector 22 detects the temperature of the SOFC 1. The second temperature detector 22 may have any configuration as long as it is capable of detecting the temperature of the SOFC 1. The second temperature detector 22 may be provided, for example, inside the SOFC 1 to detect the temperature of the SOFC 1 directly. Otherwise, the second temperature detector 22 may be provided in a predetermined place which correlates with the temperature of the SOFC 1 to detect the temperature of the SOFC 1 indirectly. Examples of the second temperature detector 22 include a thermocouple, and a thermistor.

Figure 8:
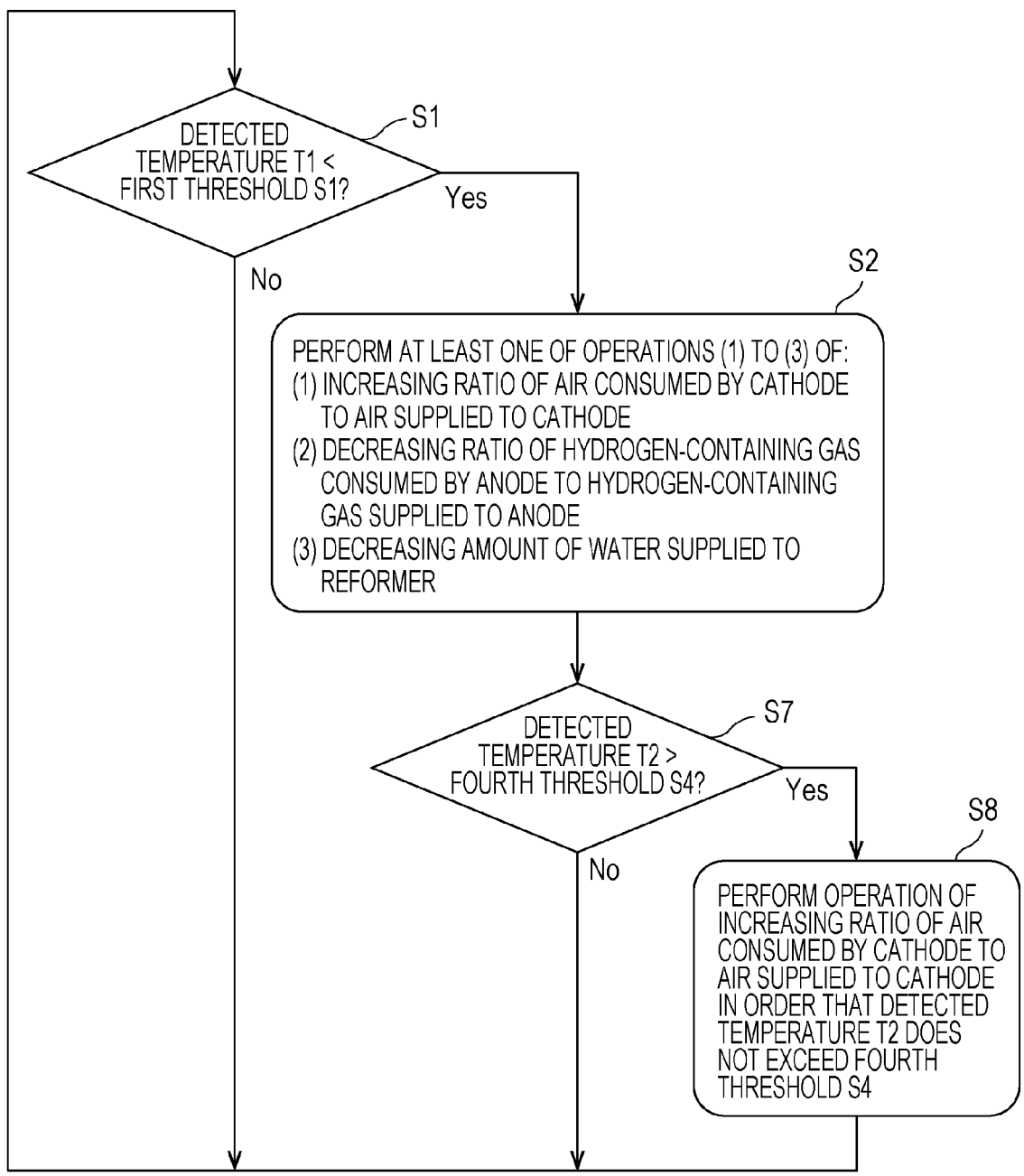
FIG. 8 is a flowchart illustrating an example of how the fuel cell system of the second embodiment operates.

If the temperature T1 detected by the first temperature detector 21 is lower than the first threshold S1, the controller 20 controls the air supplier 12 in order to decrease the flow rate of the air supplied to the cathode of the SOFC 1 within a range in which the temperature T2 detected by the second temperature detector 22 does not exceed the preset fourth threshold S4, FIG. 8 is a flowchart illustrating an example of how the fuel cell system of the second embodiment operates. Incidentally, steps S1 and S2 in FIG. 8 are the same as those in FIG. 2. For this reason, detailed descriptions for the steps will be omitted.

If the temperature T1 detected by the first temperature detector 21 is lower than the preset first threshold S1 ("Yes" in step S1), the fuel cell system 100 of the embodiment performs, in step S2, at least one of: the operation of increasing the ratio of the air consumed by the cathode of the SOFC 1 to the air supplied to the cathode thereof: the operation of decreasing the ratio of the hydrogen-containing gas consumed by the anode of the SOFC 1 to the hydrogen-containing gas supplied to the anode thereof; and the operation of decreasing the amount of water supplied to the reformer 4.

Subsequently, in the foregoing operation, the temperature of the SOFC 1 is detected by the second temperature detector 22, and it is determined whether the temperature T2 detected by the second temperature detector 22 is higher than the preset fourth threshold S4 (step S7). Incidentally, based on the temperature characteristic and life characteristic of the SOFC 1, the fourth threshold S4 for step S7 may be set at an upper limit value of a temperature at which the power generation performance of the fuel cell system 100 is less likely to decrease during a long-term operation.

If in step S7, the temperature T2 detected by the second temperature detector 22 is equal to or lower than the fourth threshold S4, the fuel cell system 100 continues its operation as it is, and resumes performing the operation of step S1 whenever deemed necessary.

If in step S7, the temperature T2 detected by the second temperature detector 22 is higher than the preset fourth threshold S4, the operation of increasing the ratio of the air consumed by the cathode of the SOFC 1 to the air supplied to the cathode thereof is performed in step S8 such that the temperature T2 detected by the second temperature detector 22 does not exceed the fourth threshold S4. For example, the air supplier 12 may be controlled so as to decrease the flow rate of the air supplied to the cathode of the SOFC 1 within the range in which the temperature T2 detected by the second temperature detector 22 does not exceed the fourth threshold S4. Moreover, although not illustrated, the operation of the fuel cell system 100 may be stopped if the temperature T2 detected by the second temperature detector 22 is higher than the fourth threshold S4.

Because of the above operation, if the temperature T1 detected by the first temperature detector 21 is lower than the first threshold S1, the fuel cell system 100 of the embodiment is capable of: performing the operation of inhibiting the decrease in the combustion temperature of the combustor 2; and decreasing the flow rate of the air supplied to the cathode of the SOFC 1. Thus, the fuel cell system 100 is capable of: inhibiting the thermal degradation of the electrolyte of the SOFC 1, peripheral members and the like; and making the combustion state of the combustor 2 more stable than ever while the combustor 2 is forming the flame.

The fuel cell system 100 and the method of running the fuel cell system 100 of this embodiment may be the same as the fuel cell system 100 and the method of running the fuel cell system 100 in any one of the first embodiment, the first and second examples of the first embodiment, as well as the first and second modifications of the first embodiment, except for the above-discussed feature. For example, like in the second example of the first embodiment, the operation of the fuel cell system 100 of this embodiment may be performed if the hydrogen consumption ratio of the hydrogen-containing gas consumed by the anode of the SOFC 1 to the hydrogen-containing gas supplied to the anode thereof is higher than the preset hydrogen consumption ratio.

It should be noted that the first embodiment, the first and second examples of the first embodiment, the first and second modifications of the first embodiment, and the second embodiment may be combined together unless they exclude each other.

From the foregoing descriptions, many improvements to and other embodiments of the present disclosure are clear to those skilled in the art. For this reason, the foregoing descriptions shall be construed as being just examples. The foregoing descriptions are provided for the purpose of teaching the best modes of carrying out the present disclosure to those skilled in the art. The detailed structures and/or functions can be virtually changed without departing from the spirit of the present disclosure.

The aspect of the present disclosure is applicable to fuel cell systems and methods for running fuel cell systems which are thereby capable of making the combustion state of the combust more stable than ever while the combustor is forming the flame.

What is claimed is:

1. A fuel cell system comprising:
   a solid oxide fuel cell which includes a cathode and an anode, and which generates power by using, as fuel, air supplied to the cathode, and a hydrogen-containing gas supplied to the anode;
   a combustor which generates a combustion exhaust gas by combusting an anode-off gas discharged from the anode of the fuel cell and a cathode-off gas discharged from the cathode of the fuel cell;
   a reformer which steam-reforms a material, and thereby generates the hydrogen-containing gas to be supplied to the anode of the fuel cell;
   a first temperature detector which detects a temperature of at least one of the combustion exhaust gas and the combustor; and
   a controller which performs, if the temperature detected by the first temperature detector is lower than a preset first threshold while the combustor is forming flame, at least one of:
     an operation of increasing a ratio of the air consumed by the cathode of the fuel cell to the air supplied to the cathode of the fuel cell, and
     an operation of decreasing an amount of water supplied to the reformer,
   the fuel cell system further comprising a second temperature detector configured to detect a temperature of the fuel cell, wherein
   if the temperature detected by the first temperature detector is lower than the preset first threshold, the controller is configured to perform the operation of increasing the ratio of the air consumed by the cathode of the fuel cell to the air supplied to the cathode of the fuel cell such that the temperature detected by the second temperature detector does not exceed a preset fourth threshold, and wherein the controller performs the at least one operation if the temperature detected by the first temperature detector is lower than the preset first threshold, and thereafter stops run of the fuel cell system if the temperature detected by the first temperature detector is a temperature lower than the preset first threshold, and is lower than a third threshold which is set in advance at a temperature below which the combustor loses the flame.

2. The fuel cell system according to claim 1, wherein if the temperature detected by the first temperature detector is lower than the preset first threshold while the combustor is forming the flame, the controller performs at least one of the operation of increasing the ratio of the air consumed by the cathode of the fuel cell to the air supplied to the cathode of the fuel cell, and the operation of decreasing the amount of water supplied to the reformer.

3. The fuel cell system according to claim 1, wherein the controller performs the at least one operation if the temperature detected by the first temperature detector is lower than the preset first threshold while the fuel cell continues generating the power.

4. The fuel cell system according to claim 1, wherein the controller performs the at least one operation if the temperature detected by the first temperature detector is lower than the preset first threshold in a case where a hydrogen consumption ratio of the hydrogen-containing gas consumed by the anode of the fuel cell to the hydrogen-containing gas supplied to the anode of the fuel cell is higher than a preset hydrogen consumption ratio.

5. The fuel cell system according to claim 1, wherein the controller performs the at least one operation if the temperature detected by the first temperature detector is lower than the preset first threshold, and thereafter stops run of the fuel cell system if the temperature detected by the first temperature detector is lower than a second threshold which is set in advance at a temperature lower than the preset first threshold.

6. The fuel cell system according to claim 1, further comprising an air supplier which supplies the air to the cathode of the fuel cell, wherein as the operation of increasing the ratio of the air consumed by the cathode of the fuel cell to the air supplied to the cathode of the fuel cell, the controller controls the air supplier so as to decrease a flow rate of the air supplied to the cathode of the fuel cell.

7. The fuel cell system according to claim 1, further comprising a material supplier which supplies the material to the reformer, wherein as the operation of decreasing the ratio of the hydrogen-containing gas consumed by the anode of the fuel cell to the hydrogen-containing gas supplied to the anode of the fuel cell, the controller controls the material supplier so as to increase a flow rate of the material supplied to the reformer.

8. The fuel cell system according to claim 1, wherein as the operation of decreasing the ratio of the hydrogen-containing gas consumed by the anode of the fuel cell to the hydrogen-containing gas supplied to the anode of the fuel cell, the controller controls the fuel cell system so as to decrease an amount of power generated by the fuel cell.

9. The fuel cell system according to claim 1, further comprising a water supplier which supplies the water to the reformer, wherein the controller controls the water supplier so as to decrease a flow rate of the water supplied to the reformer.

10. A method of running a fuel cell system which includes a solid oxide fuel cell, a combustor, a reformer, a first temperature detector, and a second temperature detector configured to detect a temperature of the fuel cell, the method comprising:

in the solid oxide fuel cell which includes a cathode and an anode, generating power by using, as fuel, air supplied to the cathode, and a hydrogen-containing gas supplied to the anode of the fuel cell;

in the combustor, generating a combustion exhaust gas by combusting an anode-off gas discharged from the anode of the fuel cell and a cathode-off gas discharged from the cathode of the fuel cell;

in the reformer, steam-reforming a material, and thereby generating the hydrogen-containing gas supplied to the anode of the fuel cell;

in the first temperature detector, detecting a temperature of at least one of the combustion exhaust gas and the combustor; and if the temperature detected by the first temperature detector is lower than a preset threshold while the combustor is forming flame, performing at least one of:

an operation of increasing a ratio of the air consumed by the cathode of the fuel cell to the air supplied to the cathode of the fuel cell, and an operation of decreasing an amount of water supplied to the reformer, wherein if the temperature detected by the first temperature detector is lower than the preset threshold, a controller is configured to perform the operation of increasing the ratio of the air consumed by the cathode of the fuel cell to the air supplied to the cathode of the fuel cell such that the temperature detected by the second temperature detector does not exceed a preset fourth threshold, and wherein the controller performs the at least one operation if the temperature detected by the first temperature detector is lower than the preset first threshold, and thereafter stops run of the fuel cell system if the temperature detected by the first temperature detector is a temperature lower than the preset first threshold, and is lower than a third threshold which is set in advance at a temperature below which the combustor loses the flame.

11. The method of running a fuel cell system, according to claim 10, wherein at least one of the operation of increasing the ratio of the air consumed by the cathode of the fuel cell to the air supplied to the cathode of the fuel cell, and the operation of decreasing the amount of water supplied to the reformer is performed if the temperature detected by the temperature detector is lower than the preset threshold while the combustor is forming the flame.

12. The fuel cell system according to claim 1, wherein if the temperature detected by the first temperature detector is lower than the preset first threshold while the combustor is forming the flame, the controller performs the operation of increasing the ratio of the air consumed by the cathode of the fuel cell to the air supplied to the cathode of the fuel cell.

13. The fuel cell system according to claim 1, wherein if the temperature detected by the first temperature detector is lower than the preset first threshold while the combustor is forming the flame, the controller performs the operation of decreasing the amount of water supplied to the reformer.

* * * * *